United States Patent
Mayr

(10) Patent No.: US 9,139,797 B2
(45) Date of Patent: Sep. 22, 2015

(54) OPERABLE TRANSMISSION, WORKING FLUID FOR SUCH A TRANSMISSION, AND METHOD FOR COMMISSIONING THE SAME

(75) Inventor: Franz Mayr, St. Marein (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 314 days.

(21) Appl. No.: 13/585,402

(22) Filed: Aug. 14, 2012

(65) Prior Publication Data

US 2012/0304792 A1    Dec. 6, 2012

Related U.S. Application Data

(63) Continuation-in-part of application No. 12/281,428, filed as application No. PCT/AT2007/000108 on Mar. 2, 2007, now abandoned.

(30) Foreign Application Priority Data

Mar. 3, 2006 (AT) .................................. GM162/2006

(51) Int. Cl.
| | |
|---|---|
| *C10M 169/04* | (2006.01) |
| *C10M 141/02* | (2006.01) |
| *C10M 173/02* | (2006.01) |
| *F16H 57/04* | (2010.01) |

(52) U.S. Cl.
CPC ....... *C10M 173/02* (2013.01); *C10M 2201/041* (2013.01); *C10M 2207/0225* (2013.01); *C10M 2209/1033* (2013.01); *C10M 2209/1045* (2013.01); *C10M 2209/1055* (2013.01); *C10N 2220/082* (2013.01); *C10N 2230/06* (2013.01); *C10N 2230/64* (2013.01); *C10N 2240/04* (2013.01); *C10N 2240/042* (2013.01); *C10N 2240/044* (2013.01); *F16H 57/0483* (2013.01); *Y10T 74/19642* (2015.01)

(58) Field of Classification Search
CPC .......................... C10M 125/14; C10M 125/02
USPC ................................................... 508/113, 160
See application file for complete search history.

(56) References Cited

U.S. PATENT DOCUMENTS

| | | | |
|---|---|---|---|
| 1,498,021 A | 6/1924 | Edwards | |
| 2,102,825 A | 12/1937 | Woodhouse et al. | |

(Continued)

FOREIGN PATENT DOCUMENTS

| | | |
|---|---|---|
| EP | 1076087 A1 | 2/2001 |
| EP | 1503113 A2 | 2/2005 |

(Continued)

*Primary Examiner* — James Goloboy
*Assistant Examiner* — Francis C Campanell
(74) *Attorney, Agent, or Firm* — Bachman & LaPointe, P.C.

(57) ABSTRACT

An operable transmission comprising toothed wheels. In order to operate the transmission with a lubricant and coolant which is environmentally friendly while providing improved heat dissipation and temperature-independent viscosity, the transmission contains a mixture of water and a glycol or similar, in which graphite particles are suspended. The mixture contains 40 to 60 percent per weight of the glycol and 2 to 25 percent by weight of graphite in the form of flaky graphite particles having a grain size of less than 12 micrometers, the remainder being composed of water and other admixtures and/or additives. Also disclosed are the lubricant and coolant as well as a method for starting a transmission operated with the lubricant and coolant.

1 Claim, 2 Drawing Sheets

(56) References Cited

U.S. PATENT DOCUMENTS

| | | |
|---|---|---|
| 2,295,299 A | 9/1942 | Shaw, Jr. |
| 3,193,504 A | 7/1965 | Ford, Jr. |
| 3,384,580 A | 5/1968 | Peace et al. |
| 4,714,414 A | 12/1987 | Miller |
| 6,482,778 B2 | 11/2002 | Tersigni et al. |
| 8,096,205 B2 | 1/2012 | Okamoto et al. |
| 2004/0209782 A1* | 10/2004 | Zhang et al. .................. 508/113 |
| 2005/0025975 A1 | 2/2005 | Okamoto et al. |
| 2005/0126749 A1 | 6/2005 | Matti et al. |

FOREIGN PATENT DOCUMENTS

| | | |
|---|---|---|
| EP | 1574757 A2 | 9/2005 |
| GB | 991272 A | 5/1965 |
| JP | 06-234989 A | 8/1994 |
| JP | 07-076695 | 3/1995 |
| JP | 2001-181669 A | 7/2001 |
| WO | 97/30137 | 8/1997 |

\* cited by examiner

OPERABLE TRANSMISSION, WORKING FLUID FOR SUCH A TRANSMISSION, AND METHOD FOR COMMISSIONING THE SAME

CROSS-REFERENCE TO RELATED APPLICATIONS

This application is a continuation-in-part of U.S. patent application Ser. No. 12/281,428, filed Dec. 16, 2008, which is the U.S. National Phase of International Application No. PCT/AT2007/000108, filed Mar. 2, 2007.

BACKGROUND OF THE INVENTION

The invention relates to an operational transmission comprising highly loaded gearwheels, whose housing forms a sump which contains a lubricant and coolant and into which at least one gearwheel dips. Such transmissions occur in a wide variety of applications, in particular in motor vehicles, as a change speed gear mechanism, distribution transmission of all wheel drive vehicles and as an axle-mounted or differential transmission.

In the case of highly loaded gearwheels, even when they are lubricated in the best possible way dissipated heat is generated which has to be carried away. This is done either by means of a coolant and lubricant circuit with a pump and an external radiator or by dissipating heat to the surroundings via the housing of the transmission. For this purpose, said housing is to have the largest possible surface. In motor vehicles, said housing is usually provided with external ribs in order to increase the surface for the transfer of heat to the passing slipstream. If the power of the engine is to be increased without more installation space being made available for the transmission, a limit is quickly reached.

At present, lubricating oils are used exclusively in transmissions, but completely synthetic oils are usually used in highly loaded ones. However, all the oils (as used herein the term "oil" comprises petroleum fractions, vegetable oils, or synthetic liquids such as hydrogentated polyolefins, esters, silicones and fluorocarbons) have the following disadvantages in common:

a relatively small thermal capacity, conductivity of heat and low coefficient of the transfer of heat (for the sake of comparison, approximately half that of water), the viscosity is highly temperature-dependent, and losses are increased as a result of this in the cold state and consumption of fuel is consequently relatively high, not environmentally friendly (disposal!) and not resistant to ageing over the long term.

For this reason, consideration has already been given to alternatives for a long time and for this purpose trials have been carried out without alternatives being proven in practice. In this context water was considered appropriate because of its excellent thermal properties. Its viscosity is largely constant, which is, on the one hand, an advantage, but, on the other hand, is not sufficient for the formation of a stable lubricating film between the tooth edges. An attempt has been made to remedy this through suitable coating of the gearwheels. Whatever coating has been attempted in the past, it was either not able to cope with the tooth edge pressure or the sliding speed or it disappeared completely after only a short operating period. This has also been found in the case of carbon coatings.

The search for alternatives is also reflected in the patent literature. For example, U.S. Pat. No. 4,714,414 discloses lubricating the gearwheels of the transmission stage of a compressor with sprayed water for oil-free compressed air. The fact that the gearwheels can be composed of plastic here indicates a low power to be transmitted. These are therefore not highly loaded gearwheels.

In the DE patent 196 05 162 C1 a synthetic working fluid is described which is composed essentially only of an alkylene glycol to which corrosion and oxidation inhibitors are added. Although the thermal properties of an alkylene glycol are better than those of oil, they do not approach those of water. In particular, the viscosity of water is higher and it is also dependent on temperature.

The object of the invention is to provide an operational transmission which avoids the disadvantages of lubricating oil and makes use of the advantages of water to the highest possible degree, without the disadvantages of water.

SUMMARY OF THE INVENTION

The object is achieved according to the invention, wherein the lubricant and coolant used is a mixture of water and an aliphatic hydrocarbon comprising at least two hydroxyl groups or comprising a compound which contains such hydrocarbons and in which graphite particles with a grain size of less than 50 micrometers are suspended. Aliphatic hydrocarbons with at least two hydroxyl groups are polyhydric alcohols, for example alkylene glycols, in particular ethylene glycol, polypropylene glycol, triethylene glycol etc. Compounds containing such alcohols may be, for example, their polymers and ethers.

The lubricant and coolant is essentially a glycol/water mixture of the type which is used in internal combustion engines with water cooling as the coolant and which additionally contains fine particles of graphite. The surprising effect of this mixture is due to the fact that, despite the presence of water, graphite with this size of particle combines with the glycol on the gearwheels to form a coating which lubricates very well even with large tooth forces and at high sliding speeds and which continuously renews and constricts itself through the quantity fed by the at least one dipping gearwheel.

This effect has been checked in continuous trials and tests and compared with a transmission of the same type with series-production oil filling. This is explained in more detail in the exemplary embodiments described below. It will be assumed that in series-production transmissions with the operating fluid according to the invention the unloaded losses are up to 50% lower than in the same transmission with a conventional oil filling and their temperature was lower by at least 15 degrees in an identical driving mode. No wear was detected. The high level of absorption of heat and dissipation of heat which were achieved with the lubricant and coolant according to the invention also permits the housing of the transmission to be positioned closer to the gearwheels, as a result of which a transmission with the same performance capability takes up less installation space.

It has therefore been possible to utilize the thermal advantages of water. The presence of glycol in the fluid also overcomes a large disadvantage of water—it can no longer freeze. An additional benefit is that glycol can be decomposed biologically and graphite is completely inert and therefore also not damaging to the environment. It is to be emphasized that structural changes to conventional transmissions are necessary only in special cases. All that has to be ensured is that the plastic of the sealing rings is not corroded and the lubricating circuit also functions with the low-viscosity medium.

The optimal mixing ratios of the components depend to a high degree on the design of the transmission and the type of gearwheels, and also on the operating conditions. The lubricant and coolant preferably contains 25 to 75 percent by weight of the aliphatic hydrocarbon or of the compound which contains such hydrocarbons and 1 to 15 percent by weight of graphite in the form of flaky graphite particles with a grain size of less than 20 micrometers, at least 10 percent by weight of water and further admixtures and/or additives. The relatively high values for the graphite are intended for gearwheels with hypoid toothing.

For transmissions, the lubricant and coolant preferably contains 40 to 60 percent by weight of the aliphatic hydrocarbon or of the compound which contains such hydrocarbons and 1 to 5 percent by weight of graphite in the form of flaky graphite particles with a grain size of less than 12 micrometers, from 25 to 50 percent by weight water and further admixtures and/or additives.

In a further development of the invention, the lubricant and coolant contains a dispersing additive as a further additive. The latter ensures continuous coating not only of the parts (gearwheels, bearings) which are to be lubricated directly but also of all the components and also of the housing walls which are protected against corrosion in this way. The dispersing additive also ensures a starting up of the gearwheels without dry friction after a long stationary time. Dispersing additives are generally high-molecular block copolymers. Preferably, the concentration of the dispersing additive in the lubricant and coolant in percent by weight is half to approximately the same as that of the carbon particles.

Mixtures of graphite, water and glycol tend at times to foam, which is disruptive in the case of small housings. An antifoaming agent can therefore be added as a further additive to the lubricant and coolant and/or a corrosion inhibitor can also be added as a further additive.

The invention also relates to an operating fluid for a transmission comprising highly loaded gearwheels, whose housing forms a sump which contains a lubricant and coolant and into which the gearwheels dip, which lubricant and coolant is a mixture.

Finally, the invention also relates to a method for commissioning a transmission, for example before it is installed in a machine or in a motor vehicle. Said method is aimed at achieving the objective of bringing into effect the advantages of the operating fluid according to the invention as far as possible immediately and without running-in losses and increased wear.

The method comprises filling the dry transmission, which arrives from the site of mechanical fabrication, with the lubricant and coolant previously mixed outside the transmission at least as far as the level that at least one of the gearwheels dips into the lubricant and coolant, then spins in an unloaded fashion until all the gearwheels and other elements which are to be lubricated and protected are wetted, in which case a consistent lubricating and protective film is formed on the gearwheels and everywhere in the transmission.

In order to reinforce and speed up the latter effect further and also to use it in areas which are difficult to access, in a further development of the method at step a), the transmission is firstly filled with the lubricant and coolant beyond the level of the axles, in which case, however, said lubricant and coolant contains a relatively high proportion of graphite (5 to 30 percent by weight), and is then spun slowly for a certain time and then the lubricant and coolant is let out at least partially and the transmission is finally filled with a lubricant and coolant to the operating level state, in which case said lubricant and coolant contains, if appropriate, a content of graphite particles which is reduced in accordance with the residual amount.

Additional protection can be provided for locations which are not wetted, for example against fretting in intermeshing toothing systems, during assembly by dipping or coating said locations with the mixture.

BRIEF DESCRIPTION OF THE DRAWINGS

The invention will be described and explained below with reference to figures, in which.

DETAILED DESCRIPTION

Figure 1:
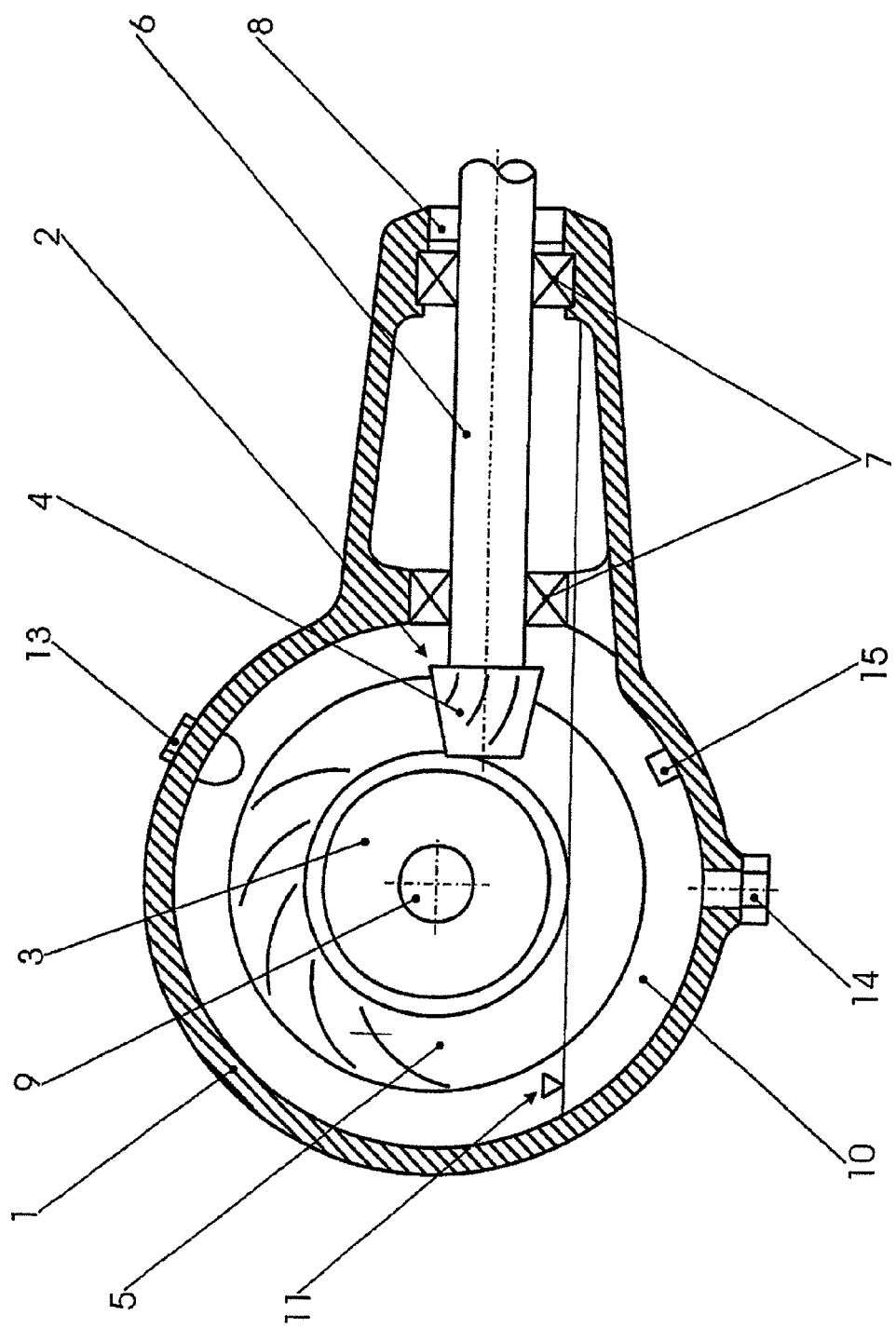
FIG. 1 is a schematic view of an example of a transmission according to the invention.

FIG. 1 is any series-production transmission, here a front-axle transmission of a motor vehicle with a hypoid drive and a differential. It could likewise be a distributor transmission or a step down transmission for driving a machine, for example in the foodstuff industry. The hypoid drive 2 and the differential 3 are located in the housing 1. The hypoid drive 2 is composed of a drive pinion 4 seated on a shaft 6 and a crown wheel 5. The shaft 6 is guided in bearings 7, the exterior of which is adjoined by a sealing ring 8. The differential 3 is also of the customary design, and is therefore not shown in a cutaway view. A half shaft 9, which leads to a wheel, is shown.

At the bottom in the interior of the housing there is an oil sump 10 whose liquid level in the stationary state is denoted by 11. The crown wheel dips into the oil sump 10. Furthermore, a filling opening and vent 13 and an outlet 14 for the lubricant and coolant as well as a temperature sensor (only installed for trials) are indicated.

However, instead of being filled with transmission oil, said transmission is filled with a lubricant and coolant which is composed essentially of an aliphatic hydrocarbon with at least two hydroxyl groups or a compound which contains such hydrocarbons, graphite particles which are suspended therein and have a grain size of less 50 micrometers, and water. Alkylene glycols, in particular ethylene glycol, propylene glycol or triethylene glycol, are possible, for example, as aliphatic hydrocarbons with at least two hydroxyl groups. Various transmissions which have been filled with oil on a series-production basis in trials, even in road trials, have been successfully tested with various compounds of this type, with various mixing ratios and with further additives. For example:
Mixture 1:

| | | |
|---|---|---|
| Glysantin ® G48 | 100 g | |
| Demineralized water | 100 g | |
| Graphite FL1199 | 4 g | FL1199: Graphite flakes which are lamellas with a grain size of 11 microns (μ) and a purity of 99% C. |

Noted in the trial log: low production of foam, no demixing in the short term, low wetting.
Mixture 2:

| | | |
|---|---|---|
| Ethylene glycol | 100 g | |
| Demineralized water | 100 g | |
| Antifoaming agent: | 1 g | Antifoaming agent 150 from Kluthe, composition according to safety data sheet. |

-continued

| | | |
|---|---|---|
| Dispersing additive: | 16 g | Additol ® VXW6394 from Cytek, composition according to technical data sheet. |
| Corrosion inhibitor: | 4 g | BWT CW-CS 8 from BWT, composition according to BWT data sheet. |
| Graphite FL1199: | 16 g | As in mixture 1. |

Noted in the trial log: no production of foam, dispersion very stable, excellent and stable wetting, after wetting no corrosion of areas not continuously wetted, excellent temperature behavior in the distribution transmission and start of continuous trial, inadequate lubrication in an axle gearing with hypoid toothing.

Mixture 3:

| | | |
|---|---|---|
| Ethylene glycol: | 100 g | |
| Demineralized water: | 100 g | |
| Antifoaming agent: | 1 g | Antifoaming agent 150 from Kluthe, composition according to safety data sheet. |
| Dispersing additive: | 20 g | Additol ® VXW6394 from Cytek, composition according to technical data sheet. |
| Corrosion inhibitor: | 2 g | BWT CW-CS 8 from BWT, composition according to BWT data sheet. |
| Graphite FL1199: | 40 g | As in mixture 1. |

Noted in the trial log: little production of foam, dispersion very stable, excellent and stable wetting, after wetting no corrosion of areas not continuously wetted, good temperature and lubrication behavior in front axle differential.

The mixture 2 was compared in the road trial with a conventional and series-production oil filling in the distributor transmission, in which case the same transmission (the distributor transmission of a luxury-class all wheel drive vehicle which contains a spur gear stage and a planetary differential) was filled with one of the operating fluids on one occasions and with the other on another occasion.

The vehicle was driven for at least 150 km at a respective constant speed of 100 km/h and 140 km/h on a level freeway in order to determine the steady-state temperatures in the transmission. Here, the temperature of the operating fluid in the sump was measured with a heat sensor. The average steady-state temperature with the mixture 2 is approximately 13° C. lower than with the series-production oil filling, irrespective of the ambient temperature. This applies to both speed values.

The mixture 3 was compared in the road trial with a conventional and series-production oil filling in the front axle gearing, with the same transmission (front axle gearing of a luxury-class all wheel drive vehicle containing a hypoid bevel gear toothing and a differential) was filled with one of the operating fluids on one occasion and with the other on another occasion.

The vehicle was driven for at least 150 km at respectively constant speeds of 100 km/h and 140 km/h on a level freeway in order to determine the steady-state temperature in the transmission. With the mixture 4, the average steady-state temperature is 16° C. or 13° C. lower than with series-production oil filling, which applies to 100 km/h and 140 km/h, irrespective of the ambient temperature.

Furthermore, a front axle differential with the mixture 3 was operated on the test bench for half an hour at a constant input drive speed of 1700 revolutions per minute, which corresponds to approximately 70 km/h, and the temperature behavior and the drag torque were measured.

Figure 2:
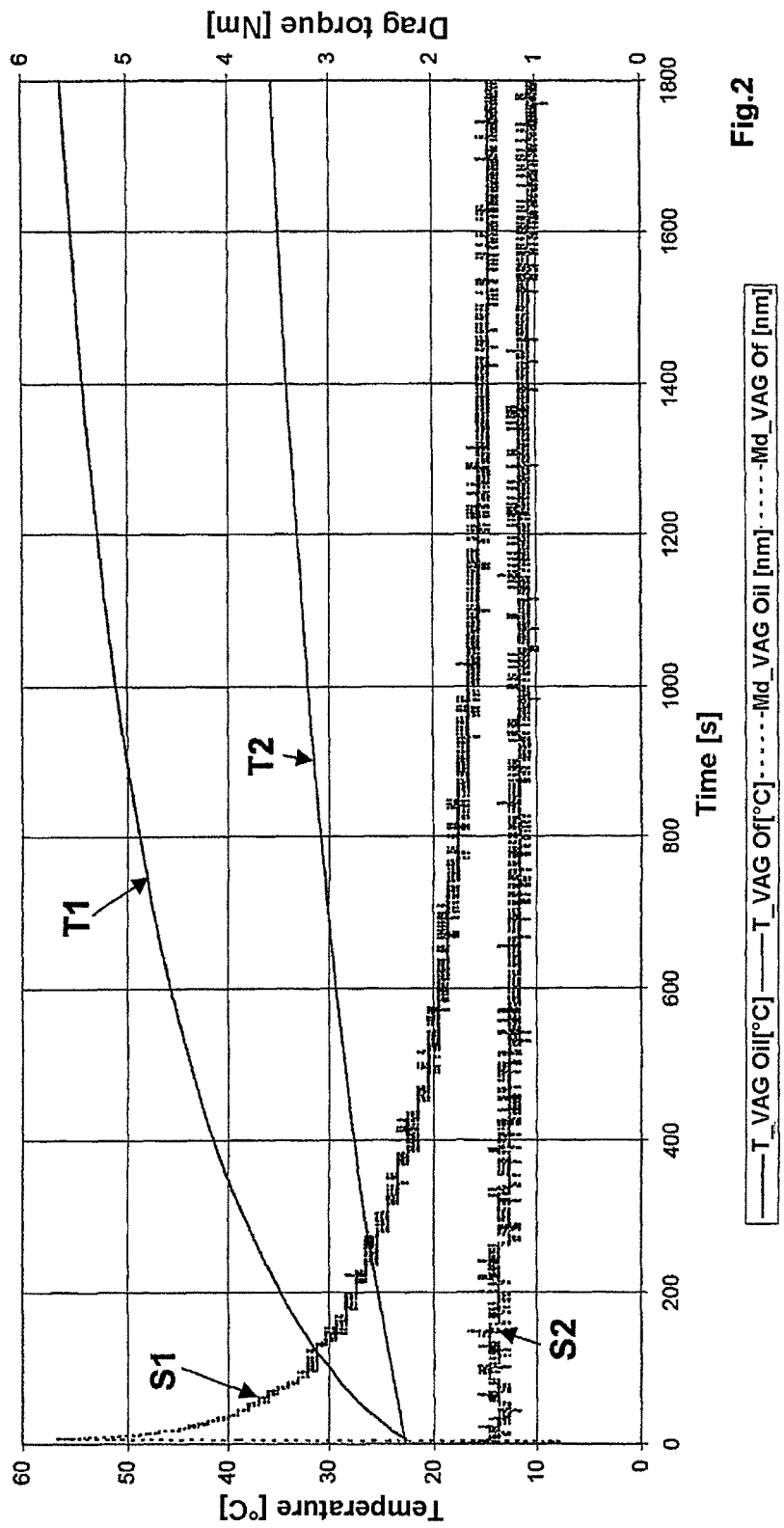
FIG. 2 is a diagram showing the result of comparative measurements on an exemplary transmission.

FIG. 2 shows the profile with 1700 $min^{-1}$ of the two measured variables of temperature T of the operating fluid in degrees Celsius and drag torque S in Nm on the ordinate, and the time on the abscissa. The trial is started with a cold transmission at approximately 23° C. The corresponding curves are T1 and S1 for the transmission filled with oil and T2 and S2 for the transmission filled with the operating fluid according to the invention. It is apparent that during the operating time the temperature T1 rises significantly more steeply and reaches 57° C., while the temperature T2 rises slowly to somewhat above 35° C. The drag torque is the sum of all the unloaded losses in the transmission (mainly friction losses and churning losses). The drag torque S1 in the transmission with the oil filling is initially very high (above 5.5 Nm) because of the highly temperature-dependent viscosity of oil, and it drops in the course of operation to approximately 1.4 Nm. The drag torque S2 is approximately constant between 1.3 and 1.0 Nm from the first moment on. This results in the lost work of 0.173 kWh for oil and 0.106 kWh for the operating fluid according to the invention in the time period of 1800 seconds, and therefore a reduction in the unloaded losses of 38.6%. In the case of a cold start in the winter (at −30° C.), a reduction in the power loss of more than 50% was found.

The importance of wetting all the parts of the transmission is apparent from the remarks in the test logs. Furthermore during the preparation of the trials it was observed that a stirring movement for a certain time improves the intimate incorporation of the graphite lamellas into the fluid mixture (homogeneous suspension). On this basis, a method for commissioning a transmission which is to be filled with the operating fluid according to the invention, which allows for these factors, was developed.

The transmission which was previously filled with a conventional lubricant was emptied and thoroughly cleaned so that it was equivalent to a new transmission arriving from the place of mechanical fabrication. Alternatively, a dry transmission without end-of-line testing was manufactured in series fabrication. The dry transmission was filled with an operating fluid of the mixture 2 or 3, which was previously mixed in a vessel, to such an extent that one of the gearwheels dipped into the lubricant and coolant. The transmission was then clamped onto a corresponding device and allowed to spin without load until the lubricant and coolant which was delivered by one of the gearwheels and scattered around had wetted all the gearwheels and other inner faces and parts. After 5 minutes, a consistent film of lubricant was formed on the tooth edges.

In one variant, in step a) the dry transmission was firstly filled to above the level of at least one of the axles with an operating fluid which contains at least 10 percent by weight of graphite. After the spinning according to step b), the operating fluid was discharged completely and the transmission was then filled with an operating fluid to the operating level state 11. Alternatively, the fluid could also only be partially discharged and could be topped up with a fluid without graphite or with very little graphite. The correct mixture is then produced during operation.

The invention claimed is:

1. A method for commissioning a transmission, on the basis of the dry transmission comprising gear wheels, comprising the following steps: a) mixing (1) water, (2) at least one of an aliphatic hydrocarbon comprising at least two hydroxyl groups and a compound which contains an aliphatic hydrocarbon comprising at least two hydroxyl groups, and (3) graphite particles, in a container outside the transmission to obtain a lubricant-coolant mixture; b) filling the dry transmission with the lubricant-coolant mixture at least to such an extent that at least one of the gearwheels dips into the lubricant-coolant mixture; and c) spinning of the transmission until all the gearwheels are wetted with the lubricant-coolant mixture wherein a consistent film of lubrication is formed on said gearwheels; wherein at step a) the transmission is filled with the lubricant-coolant mixture beyond the level of at least one axle, wherein said lubricant-coolant mixture contains 1 to 15 percent by weight of graphite, and wherein in step b) the lubricant-coolant mixture is drained at least partially and the transmission is filled with a further lubricant-coolant mixture to an operating level state, wherein said further lubricant-coolant mixture contains a content of graphite particles which is lower than that of said lubricant-coolant mixture of step a).

* * * * *